Inventor
Arthur W. Gaubatz
By
Willits, Helmig & Baillio
Attorneys

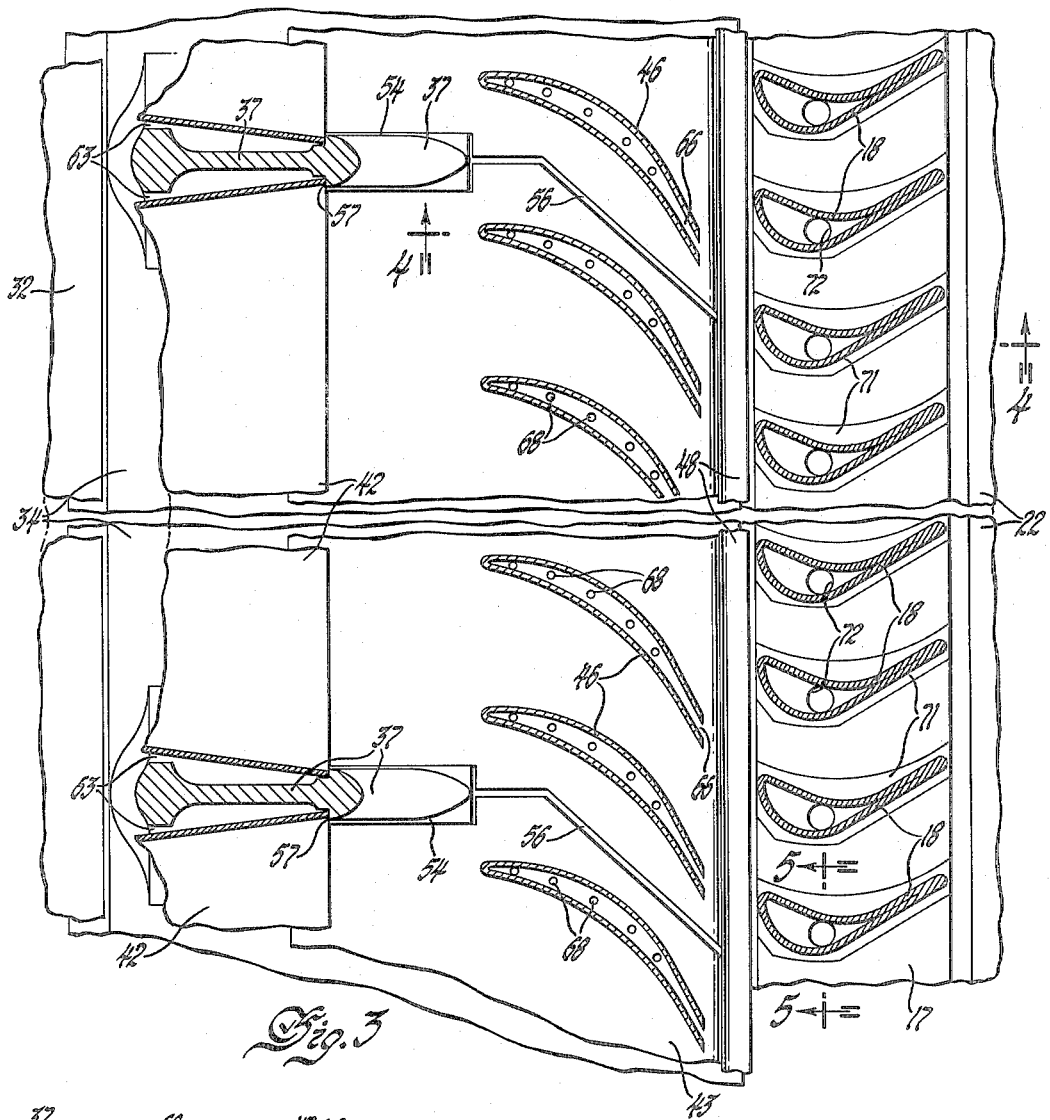
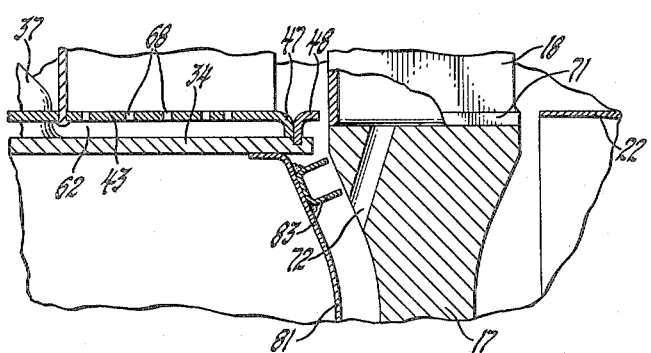
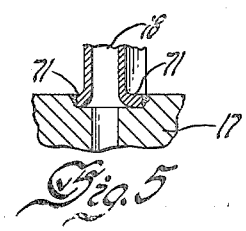

2,743,579

GAS TURBINE ENGINE WITH TURBINE NOZZLE COOLED BY COMBUSTION CHAMBER JACKET AIR

Arthur W. Gaubatz, Indianapolis, Ind., assignor to General Motors Corporation, Detroit, Mich., a corporation of Delaware Application November 2, 1950, Serial No. 193,687

3 Claims. (Cl. 60—39.36)

My invention relates to gas turbine engines and, more specifically, to arrangements for cooling the turbines of such engines.

It has long been recognized that the most critical factor limiting the performance of gas turbine engines is the maximum temperature of the combustion gases which the turbine will stand. Efforts toward increasing the efficiency of gas turbines have very largely been directed, therefore, toward increasing the temperature of the combustion gases admitted into the turbine. Progress in this development has largely resulted from the development of materials resistant to higher temperatures.

It is also generally realized that increased efficiency may be obtained by cooling the nozzles and blades of gas turbines so that the temperature of these elements will be substantially below the temperature of the gas stream, thus permitting higher gas temperatures.

While many and various proposals for cooling gas turbines have been advanced, but slight improvement has been realized. The present invention is directed to a turbine construction which will provide substantial cooling of the nozzles and blades with no significant increase in complexity or weight of the engine, and which is readily capable of application to gas turbines of commercial and military types which have proved themselves in service.

The invention provides a practical solution to the problem of securing a highly beneficial amount of cooling of the turbine, which permits operation with less dilution of the combustion gases, and, therefore, greater efficiency and output in gas turbine engines. The invention is particularly applicable to engines for aircraft purposes where weight must be minimized and simplicity and reliability are of utmost importance.

The principal objects of the invention are to improve the performance of gas turbine engines and to provide cooling for the nozzles and turbine rotor blades of such engines. A further object is to provide an improved engine structure with suitable provisions for expansion and for ready access for inspection or repair of parts.

The manner in which these objects are realized and various subordinate advantages of the invention will be apparent to those skilled in the art from the appended description of the preferred embodiment of the invention.

Figure 1:
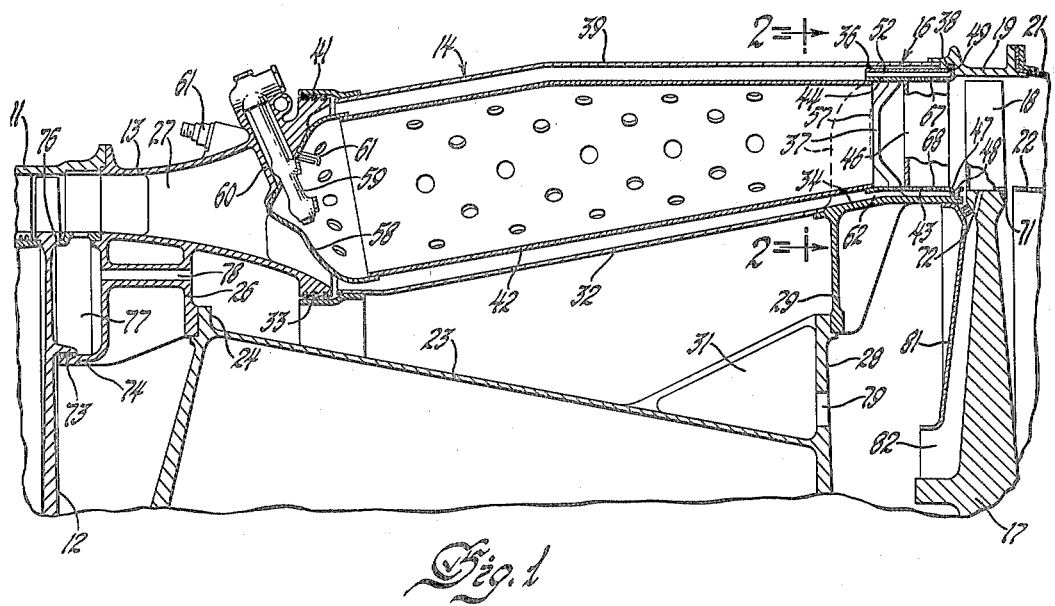
Figure 2:
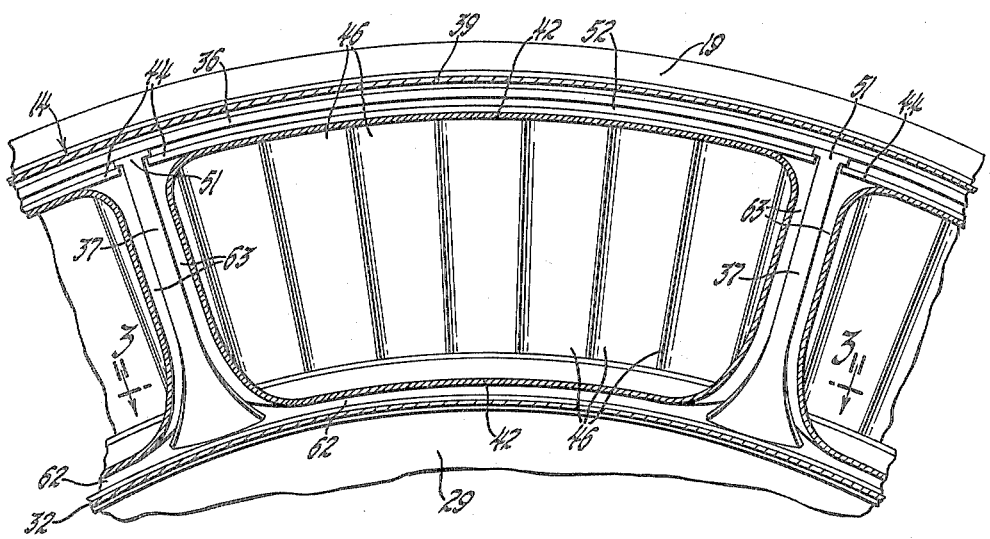

Referring to the drawings, Figure 1 is a partial longitudinal sectional view of a gas turbine engine incorporating the invention; Figure 2 is a partial sectional view of the same, taken on the plane indicated in Figure 1; Figure 3 is a partial developed section of the nozzle box and turbine wheel taken on the plane indicated in Figure 2; Figure 4 is an enlarged partial longitudinal section taken on the plane indicated in Figure 3; and Figure 5 is a detail sectional view taken on the plane indicated in Figure 3.

It will be understood that gas turbine engines of the type referred to commonly include a compressor, a turbine driving the compressor, and a combustion chamber or chambers supplied with air by the compressor and discharging hot combustion gases into the turbine. The engine may deliver power in the form of mechanical energy from the turbine shaft or in the form of kinetic energy of the exhaust gases. The invention is of course adaptable to gas turbines of more complicated types, but is illustrated as embodied in a simple engine of the type described.

The general nature of such engines is familiar to those skilled in the art, the details of the engine are subject to great variation, and, moreover, many details of the engine are immaterial to the invention; therefore, in the interest of conciseness, no attempt will be made to describe a complete gas turbine engine in detail.

Referring to the drawings, the outlet end of the compressor casing is indicated at 11, and the last stage compressor wheel at 12. The compressor discharges into an annular diffuser 13 on which is supported the forward end of an annular combustion apparatus indicated generally at 14. The discharge end of the combustion apparatus is supported by a turbine nozzle ring 16. A turbine wheel 17, on which are mounted blades 18, rotates within a turbine casing 19 fixed to the nozzle assembly. The turbine exhausts into an annular passage defined by an outer wall 21 and an inner wall 22. The shafts of the turbine and compressor (not shown) are mounted in bearings in a bearing support casting 23 in any suitable manner, this support casting also providing the principal frame member of the engine. The support casting may be annular, and is formed with a flange 24 at its forward end to which the flange 26 of the diffuser casing may be bolted. Struts 27 extend between the inner and outer walls of the diffuser 13. The bearing support 23 includes a flange 28 at its rear end on which is mounted the turbine nozzle support ring 29. Ribs or buttresses 31 may be provided to strengthen the flange 28.

The forward part of the compressor, the shafting joining the turbine and compressor, and the bearings for this shafting are not shown, as the details thereof are immaterial to the invention, and any suitable arrangement may be employed.

The inner shroud 32 of the combustion chamber 14 is seated on the nozzle support ring 29 and on the diffuser 13. Seals 33, which may be of the piston ring type, mounted in grooves in the diffuser, engage the forward end of the shroud 32 to provide for thermal expansion.

The nozzle box comprises an inner ring 34 and an outer ring 36 joined by radial struts 37. The turbine casing 19 may be in the form of a split ring with a recess engaging over an upturned flange 38 at the rear end of the outer nozzle box ring 36. The outer shroud 39 of the annular combustion space 14 fits over the ring 36 and within the forward end of the turbine casing 19. The outer shroud may conveniently be in two semi-cylindrical parts provided with flanges and bolted together. The forward end of the outer shroud 39 is slidably mounted on piston ring seals 41 on the outer surface of the rear end of the diffuser 13. The combustion apparatus comprises a number of generally parallel combustion chambers 42 mounted between the inner and outer shrouds.

The turbine nozzle mounted between the rings 34 and 36 is segmented, comprising a plurality of arcuate inner shroud strips 43 and arcuate outer shroud strips 44 between which extend the radial nozzle blades 46 which are fixed to the strips. Each inner nozzle ring segment 43 is provided at its rear end with an inwardly directed flange 47 (Fig. 4) which rides on the support ring 34 and abuts a flange ring 48 seated in the ring 34. The outer nozzle ring segments 44 are formed with a flange 49 which seats within the groove in the turbine casing 19 between the face of the turbine casing and the flange 38 of the outer nozzle box ring. The outer ends of the support arms 37 are formed with heads 51 under which the edges of the outer nozzle rings 44 engage, thus aligning the outer nozzle ring and preserving an annular air passage 52 between the nozzle box and the nozzle ring 44.

As will be more clearly apparent from Figure 3, one segment of the nozzle is seated between each two adjacent support arms 37, the support arm extending between the segments and thus preventing any circumferential movement of the segments. As indicated at 54 and 56, some clearance is provided between the ends of the nozzle segments and the support arms 37 and between the abutting ends of the nozzle segments, so that circumferential expansion of the nozzle segments may take place. The rear or outlet ends of the combustion chambers or flame tubes 42 are disposed between the support arms 37 as is shown in Figure 2. These outlet ends are approximately of the form of a sector of an annulus with rounded corners. The outer and inner surfaces of the discharge end of each flame tube rests between and against the surfaces of the nozzle rings 44 and 43. The radial edges of the flame tubes are received against shoulders 57 (Figures 1 and 3) on the arms 37, thereby limiting rearward movement of the flame tubes. The forward end of each flame tube 42, which is preferably of circular section, is slid into a combustion chamber cap or dome 58 fixed to an arm 60 projecting into the diffuser 13. As will be apparent, the numbers of flame tubes 42, support arms 37, and turbine nozzle segments are equal. In general, the number of these may vary, but the preferred number is ten.

A fuel nozzle assembly 59 projects into the dome 58 through the support 60 and an ignition device or spark plug 61 likewise projects into the forward end of the combustion chamber. Combustion chamber domes 58 and cylinders 42 are perforated to admit air for combustion, as is common practice. Air discharged by the compressor 11 flows between the shrouds 32 and 39 and the major part of this air flows into the combustion chambers 42 and is discharged from the outlets of the combustion chambers to the turbine nozzle 16; however, the combustion chambers are spaced from each other and from the inner and outer shrouds so that some of the air discharged from the compressor flows over the outer surfaces of the combustion chambers and cools them. A portion of the cooling air passes from the combustion apparatus 14 into the annular passage 52 between the rings 36 and 44 and a further portion into a passage 62 between the rings 43 and 34. The discharge ends of the combustion chambers are also slightly spaced from the support arms 37 to provide passages 63 on each side of the support arms for air which cools the support arms and the radial surfaces of the discharge portion of the combustion chambers 42. The air passing through the passages 63 proceeds directly into the turbine inlet and cools the turbine only by virtue of slight additional dilution of the combustion gases. The air entering the nozzle assembly through the passages 52 and 62, however, directly cools the outer and inner nozzle rings and the nozzle vanes 46. The vanes 46, as shown most clearly in Figure 3, are of sheet metal formed to an appropriate blade section. The form of the blades may be similar to that generally employed for turbine nozzles, except that the blades are open at the trailing edge as indicated at 66. These formed sheet metal blades may be welded to the nozzle rings 43 and 44. The rings are perforated, as indicated at 67 and 68, to admit air from the passages 52 and 62 to the inside of the blades. The air thus enters at both ends of each blade and is discharged through the slot 66 in the trailing edge of the blade. A constant circulation of air over the outer surface of the nozzle rings and through the nozzle vanes is thus maintained, providing very considerable cooling of these parts.

The turbine blades 18 are likewise cooled. For this purpose, the turbine blades are hollow and open at the outer ends, and provision is made for admitting cooling air to the blade roots. The turbine blades 18 may be of a tubular type of construction, as illustrated in Figures 3 and 5, formed to an appropriate section and with flanges 71 at the base. These flanges are seated in grooves or slots milled or otherwise formed in the rim of the turbine wheel 17, and may be secured by welding as indicated in Figure 5. A radial passage 72 (Fig. 4) extends from the forward face of the turbine wheel into the base of each blade 18 to admit cooling air to the blade. This air may be derived from various sources, preferably from leakage air at the compressor outlet. Referring to Figure 1, a labyrinth seal is provided at 73 between the final compressor wheel and the flange 74 of the diffuser assembly or casing. Only a partial seal is provided at 76 between the rim of the last compressor wheel and the diffuser entrance. Leakage through the partial seal 76 thus enters the annular chamber 77 from which it passes through passages 78 in the diffuser assembly, between the diffuser 13 and inner combustion shroud 32 and the bearing support 23, and through openings 79 in the rear flange 28 of the bearing support. This air is guided over the forward face of the turbine wheel by the cooling air deflector plate 81 mounted on the inner ring 34 of the nozzle support. Deflector 81 is open around the hub of the turbine wheel to provide an entrance 82 for cooling air which passes outward over the face of the wheel and through the openings 72 in the turbine wheel. A channel 83 welded to the deflector 81 closely approaching the rim of the turbine wheel 17 provides a partial seal exteriorly of the openings 72 and thus limits the escape of cooling air into the gas flow path between turbine blades 18. The rotating turbine wheel and blades act to some extent as a centrifugal fan, and thus aids the circulation of cooling air outwardly through the blades 18.

A small portion of the cooling air entering through the passages 52 and 62 may enter the nozzle through the narrow spaces 56 between the nozzle segments. Because of the lower velocity of this air relative to that of the combustion gases, the pressure outside the nozzle segment is greater than that inside so that the combustion gases do not escape through the gaps between the nozzle segments.

It will be apparent to those skilled in the art that many modifications of the engine and of structural components of the preferred embodiment of the invention may be made within the scope and principles of the invention, which is not to be construed as limited by the detailed description of the preferred embodiment thereof.

I claim:

1. A gas turbine engine comprising, in combination, a combustion apparatus comprising a plurality of flame tubes mounted in spaced generally parallel relation, a nozzle box located at and supporting the discharge end of the combustion apparatus, the nozzle box comprising inner and outer rings and struts extending between the rings, and a turbine nozzle mounted in the nozzle box comprising inner and outer shrouds and vanes extending between the shrouds, the discharge ends of the flame tubes being mounted on the nozzle shrouds, and the struts being disposed at the discharge ends of the flame tubes, each strut defining an abutment engaging the discharge ends of the adjacent flame tubes through a portion of the length of the strut and each strut being spaced from the adjacent flame tubes through the remaining portion of the length of the strut to provide a passage for cooling air from the combustion apparatus between the flame tubes over the struts.

2. A gas turbine engine comprising, in combination, an annular combustion chamber, a plurality of flame tubes mounted therein in spaced generally parallel relation, a nozzle box located at and supporting the discharge end of the combustion chamber, the nozzle box comprising inner and outer rings and struts extending between the rings, and a turbine nozzle mounted in the nozzle box comprising inner and outer shrouds and vanes extending between the shrouds, the shrouds being provided with flanges extending away from the gas flow path at the discharge end of the nozzle and engaging the nozzle box rings to define air passages from the combustion chamber terminated by the flanges, the discharge ends of the flame tubes being mounted on the nozzle shrouds, and the struts being disposed at the discharge ends of the flame tubes, each strut defining an abutment engaging the discharge ends of the adjacent flame tubes through a portion of the length of the strut and each strut being spaced from the adjacent flame tubes through the remaining portion of the length of the strut to provide a passage for cooling air from the combustion chamber spaces between the flame tubes over the struts.

3. A gas turbine engine comprising, in combination, an annular combustion chamber, a plurality of flame tubes mounted therein in spaced generally parallel relation, a nozzle box located at and supporting the discharge end of the combustion chamber, the nozzle box comprising inner and outer rings and struts extending between the rings, and a turbine nozzle mounted in the nozzle box comprising inner and outer shrouds and hollow vanes extending between the shrouds, the shrouds being provided with flanges extending away from the gas flow path at the discharge end of the nozzle and engaging the nozzle box rings to define air passages from the combustion chamber terminated by the flanges, the shrouds being formed to discharge air from the air passages into the vanes, the vanes being formed to discharge the cooling air from the vanes into the passage between the shrouds, the discharge ends of the flame tubes being mounted on the nozzle shrouds, and the struts being disposed at the discharge ends of the flame tubes, each strut defining an abutment engaging the discharge ends of the adjacent flame tubes through a portion of the length of the strut and each strut being spaced from the adjacent flame tubes through the remaining portion of the length of the strut to provide a passage for cooling air from the combustion chamber spaces between the flame tubes over the struts.

References Cited in the file of this patent

UNITED STATES PATENTS

| | | |
|---|---|---|
| 1,819,485 | Sedlmeir | Aug. 18, 1931 |
| 1,928,504 | Schaper | Sept. 26, 1933 |
| 2,066,788 | Lysholm | Jan. 5, 1937 |
| 2,149,510 | Darrieus | Mar. 7, 1939 |
| 2,309,003 | Norris | Jan. 19, 1943 |
| 2,399,046 | Larrecq | Apr. 23, 1946 |
| 2,445,661 | Constant et al. | July 20, 1948 |
| 2,479,573 | Howard | Aug. 23, 1949 |
| 2,599,470 | Meyer | June 3, 1952 |
| 2,608,057 | Boyd et al. | Aug. 26, 1952 |
| 2,625,793 | Mierley et al. | Jan. 20, 1953 |
| 2,640,319 | Wislicenus | June 2, 1953 |
| 2,647,368 | Triebbnigg et al. | Aug. 4, 1953 |

FOREIGN PATENTS

| | | |
|---|---|---|
| 346,599 | Germany | Jan. 5, 1922 |
| 687,108 | Germany | Jan. 23, 1940 |